(12) United States Patent
Gerges et al.

(10) Patent No.: US 9,121,316 B2
(45) Date of Patent: Sep. 1, 2015

(54) EXHAUST GAS HEAT RECOVERY DEVICE

(75) Inventors: Ihab Edward Gerges, Oakville (CA); John G. Burgers, Oakville (CA); Doug Vanderwees, Mississauga (CA); Alan K. Wu, Kitchener (CA); Michael A. Martin, Hamilton (CA); Michael Bardeleben, Oakville (CA); Allan K. So, Mississauga (CA)

(73) Assignee: Dana Canada Corporation, Oakville, Ontario (CA)

( * ) Notice: Subject to any disclaimer, the term of this patent is extended or adjusted under 35 U.S.C. 154(b) by 318 days.

(21) Appl. No.: 13/599,339

(22) Filed: Aug. 30, 2012

(65) Prior Publication Data
US 2013/0061584 A1 Mar. 14, 2013

Related U.S. Application Data

(60) Provisional application No. 61/532,677, filed on Sep. 9, 2011.

(51) Int. Cl.
*F01N 5/02* (2006.01)
*F02M 31/08* (2006.01)
(Continued)

(52) U.S. Cl.
CPC ............... *F01N 5/02* (2013.01); *F28D 9/0056* (2013.01); *F28D 21/0003* (2013.01); *F28F 9/0251* (2013.01); *F28F 27/02* (2013.01); *F01N 2240/02* (2013.01); *Y02T 10/16* (2013.01)

(58) Field of Classification Search
CPC ............ F28D 21/0003; F28D 21/0015; F28D 7/1607; F01N 5/02
USPC ............... 165/103, 96, 100, 164, 165, 51, 52; 60/320, 324
See application file for complete search history.

(56) References Cited

U.S. PATENT DOCUMENTS 1,810,286 A 6/1931 MacPhee
2,268,979 A 1/1942 Williamson
(Continued)

FOREIGN PATENT DOCUMENTS

EP 0913561 A2 5/1999
EP 1291509 12/2003
(Continued)

OTHER PUBLICATIONS

U.S. Appl. No. 61/366,730, filed Jul. 22, 2010 (Sloss).
(Continued)

*Primary Examiner* — Audrey K Bradley
*Assistant Examiner* — Anthony Ayala Delgado
(74) *Attorney, Agent, or Firm* — Marshall & Melhorn, LLC

(57) ABSTRACT

A device for recovering heat from a hot gas stream comprises a gas diverter valve and a gas/liquid heat exchanger. The diverter valve comprises a valve body; a valve element movable between a bypass position and a heat exchange position; and a gas inlet and a gas outlet formed in the valve body. The heat exchanger comprises a heat exchanger core comprised of a stack of core plates arranged parallel to the exhaust gas flow path, and the heat exchanger is located outside the exhaust gas flow path and may be spaced therefrom so as to avoid unwanted heat transfer with the valve in bypass mode. The heat exchanger may include a bottom-most gas flow path adjacent to the bottom plate, and may include a mounting plate which is mechanically secured to the valve body, with a thermally insulating gasket provided between the mounting plate and the valve body.

19 Claims, 10 Drawing Sheets

(51) Int. Cl.

| | | |
|---|---|---|
| F28F 27/00 | (2006.01) | |
| F28F 27/02 | (2006.01) | |
| F28D 7/02 | (2006.01) | |
| F01N 3/02 | (2006.01) | |
| F01N 1/00 | (2006.01) | |
| F28F 9/02 | (2006.01) | |
| F28D 9/00 | (2006.01) | |
| F28D 21/00 | (2006.01) | |

(56) References Cited

U.S. PATENT DOCUMENTS

| | | |
|---|---|---|
| 3,050,935 A | 8/1962 | Eastwood |
| 3,570,590 A | 3/1971 | Kofink |
| 3,939,813 A | 2/1976 | Hurrow et al. |
| 4,391,235 A | 7/1983 | Majkrzak |
| 4,593,749 A | 6/1986 | Schatz |
| 4,685,430 A | 8/1987 | Ap |
| 6,141,961 A | 11/2000 | Rinckel |
| 6,155,042 A | 12/2000 | Perset et al. |
| 6,164,553 A | 12/2000 | Derksen |
| 6,244,256 B1 | 6/2001 | Wall et al. |
| 6,250,380 B1 | 6/2001 | Strahle et al. |
| 6,293,337 B1 | 9/2001 | Strahle et al. |
| 6,360,532 B2 | 3/2002 | Strahle et al. |
| 6,920,918 B2 | 7/2005 | Knecht et al. |
| 6,935,319 B2 | 8/2005 | Aupperle et al. |
| 6,942,027 B2 | 9/2005 | Klotten et al. |
| 6,955,213 B2 | 10/2005 | Stonehouse et al. |
| 7,036,565 B2 | 5/2006 | Brost et al. |
| 7,055,584 B2 | 6/2006 | Brost |
| 7,056,173 B1 | 6/2006 | Shull et al. |
| 7,077,114 B2 | 7/2006 | Husges |
| 7,159,650 B2 | 1/2007 | Brost et al. |
| 7,168,419 B2 | 1/2007 | Rosin et al. |
| 7,243,707 B2 | 7/2007 | Brost et al. |
| 7,287,579 B2 * | 10/2007 | Dilley et al. .................. 165/167 |
| 7,380,544 B2 | 6/2008 | Raduenz et al. |
| 7,581,533 B1 | 9/2009 | Moran |
| 7,631,688 B2 | 12/2009 | Brost et al. |
| 7,703,506 B2 | 4/2010 | Brost et al. |
| 7,721,792 B2 * | 5/2010 | Kammler et al. ............. 165/103 |
| 7,743,816 B2 | 6/2010 | Mercz et al. |
| 7,823,798 B2 | 11/2010 | Le Lievre |
| 7,836,945 B2 | 11/2010 | Speer |
| 7,958,874 B2 | 6/2011 | Kobayashi et al. |
| 8,011,175 B2 | 9/2011 | Husges et al. |
| 8,020,610 B2 | 9/2011 | Soldner et al. |
| 8,033,323 B2 | 10/2011 | Schatz et al. |
| 8,079,410 B2 | 12/2011 | Kim |
| 8,146,344 B2 | 4/2012 | Harada |
| 8,341,951 B2 * | 1/2013 | Prior et al. ...................... 60/320 |
| 2003/0192606 A1 | 10/2003 | Heckt |
| 2004/0182440 A1 | 9/2004 | Watts et al. |
| 2004/0251012 A1 | 12/2004 | Bush et al. |
| 2005/0199381 A1 | 9/2005 | Mercz et al. |
| 2008/0115487 A1 | 5/2008 | Harada et al. |
| 2008/0184974 A1 | 8/2008 | Kobayashi et al. |
| 2008/0223563 A1 | 9/2008 | Penny et al. |
| 2008/0314569 A1 * | 12/2008 | Yamazaki et al. ............ 165/153 |
| 2009/0000577 A1 * | 1/2009 | Miyagawa ................... 123/41.2 |
| 2009/0038302 A1 | 2/2009 | Yamada et al. |
| 2009/0044525 A1 | 2/2009 | Husges et al. |
| 2009/0049832 A1 | 2/2009 | Huse |
| 2009/0056909 A1 | 3/2009 | Braun |
| 2009/0090486 A1 | 4/2009 | Geskes et al. |
| 2009/0235654 A1 | 9/2009 | Kobayashi et al. |
| 2009/0277165 A1 | 11/2009 | Geskes et al. |
| 2010/0089043 A1 | 4/2010 | Dittmann et al. |
| 2010/0146954 A1 | 6/2010 | Sloss et al. |
| 2011/0088378 A1 | 4/2011 | Prior et al. |
| 2011/0088671 A1 | 4/2011 | Johnson |
| 2011/0088672 A1 | 4/2011 | Prior et al. |
| 2011/0099989 A1 | 5/2011 | Prior et al. |
| 2011/0239634 A1 | 10/2011 | Reynolds |
| 2012/0017575 A1 | 1/2012 | Sloss |
| 2012/0067545 A1 | 3/2012 | Yamazaki et al. |
| 2012/0102934 A1 | 5/2012 | Magnetto |
| 2012/0102952 A1 | 5/2012 | Spohn et al. |
| 2012/0151999 A1 | 6/2012 | Seybold et al. |
| 2012/0152487 A1 | 6/2012 | Styles et al. |

FOREIGN PATENT DOCUMENTS

| | | |
|---|---|---|
| EP | 1431527 | 6/2004 |
| EP | 1475532 A2 | 11/2004 |
| EP | 1739298 A2 | 1/2007 |
| EP | 1748179 | 1/2007 |
| EP | 2381083 A1 | 10/2011 |
| FR | 2755727 A1 | 5/1998 |
| FR | 2859238 A1 | 3/2005 |
| FR | 2859239 A1 | 3/2005 |
| FR | 2859238 B1 | 1/2006 |
| FR | 2859239 B1 | 1/2006 |
| FR | 2924162 A1 | 5/2009 |
| FR | 2966873 A1 | 5/2012 |
| GB | 192489 | 2/1923 |
| GB | 1300948 | 12/1972 |
| GB | 1473153 | 5/1977 |
| GB | 2420593 | 5/2006 |
| GB | 2441588 | 12/2008 |
| JP | 7-269332 | 10/1995 |
| JP | 2008215336 | 9/2008 |
| JP | 2009091918 | 4/2009 |
| JP | 2009191630 | 8/2009 |
| JP | 2009257208 | 11/2009 |
| JP | 2012026296 | 2/2012 |
| JP | 2012031929 | 2/2012 |
| WO | WO 00/28203 A1 | 5/2000 |
| WO | WO 01/50047 A1 | 7/2001 |
| WO | WO 03/001114 A1 | 1/2003 |
| WO | WO 2004/097192 | 11/2004 |
| WO | WO 2006/086054 A1 | 8/2006 |
| WO | WO 2011/132035 A1 | 10/2011 |
| WO | WO 2012/010960 A1 | 1/2012 |
| WO | WO 2012/056179 A2 | 5/2012 |

OTHER PUBLICATIONS

English Abstract of FR2755727 A1, published on May 15, 1998.
Partial English translation of the claims of FR2859239 B1.
FR2859238 A1 English machine translation from ESP@cenet.
FR2859239 A1 English machine translation from ESP@cenet.
International Search Report and Written Opinion for PCT/CA2012/050598.

* cited by examiner

EXHAUST GAS HEAT RECOVERY DEVICE

CROSS-REFERENCE TO RELATED APPLICATION

This application claims priority to and the benefit of U.S. Provisional Patent Application No. 61/532,677 filed Sep. 9, 2011, the contents of which are incorporated herein by reference.

FIELD OF THE INVENTION

The invention relates to devices for removing heat from gas streams, such as heat recovery devices for removing heat from motor vehicle intake and exhaust gas systems.

BACKGROUND OF THE INVENTION

The need to remove heat from gas streams arises in numerous applications. In motor vehicles, for instance, it may be necessary to remove heat from the intake and/or exhaust gas streams. For example, intake air (or "charge air") requires cooling in some applications, for example in turbocharged or supercharged engines. In vehicles incorporating exhaust gas recirculation (EGR) or exhaust gas heat recovery (EGHR) systems, heat is removed from the exhaust gas stream. The heat removed from the intake or exhaust gas stream is typically transferred to a liquid coolant in a heat exchanger.

In EGHR systems, for example, heat from vehicle exhaust gases is transferred to other vehicle components via a liquid coolant in order to provide faster heating of air and vehicle fluids on start-up of the vehicle, thereby reducing fuel consumption. Air heated by the exhaust gases can be used for rapid heating of the passenger compartment and for window defrosting, reducing the need for long idling periods during start-up in cold weather. Heating of vehicle fluids such as engine oil and transmission fluid makes them less viscous and improves fuel economy during start-up. After the initial start-up period the recovery of heat from the exhaust gases is no longer required. Therefore, EGHR systems typically include a bypass to minimize heat transfer from the exhaust gases to the liquid coolant once the vehicle reaches normal operating temperature. This helps to minimize the load on the cooling system.

An EGHR system therefore incorporate a gas to liquid heat exchanger for extracting heat from the vehicle exhaust gas and transferring the heat to a liquid coolant, typically a water/glycol engine coolant. The EGHR system also includes a diverter valve for directing at least a portion of the exhaust gas flow through the heat exchanger during vehicle start-up, and for bypassing the heat exchanger once the heat from the exhaust gas is no longer required. An actuator is also provided in order to control operation of the valve. The valve may be operated by means of an electronically controlled solenoid or by a wax motor.

To save space and to reduce cost and vehicle weight, the valve and heat exchanger may be integrated into a single unit, referred to herein as an EGHR device. In many integrated EGHR devices, however, the heat exchanger is heated by the exhaust gases whether the device is in heat exchange mode or bypass mode. This increases the amount of heat transferred to the coolant, increasing the load on the cooling system, and also producing thermal stresses which can cause damage to the heat exchanger.

There remains a need for simple and effective EGHR devices for motor vehicle intake and exhaust gas systems which minimize usage of space, weight, and number of components, and which also minimize thermal stresses and unwanted heat transfer to the coolant in bypass mode.

SUMMARY OF THE INVENTION

In an embodiment, there is provided a heat recovery device comprising a gas diverter valve and a gas/liquid heat exchanger. The gas diverter valve comprises a valve body; a valve element movable between a bypass position and a heat exchange position; and a gas inlet and a gas outlet formed in the valve body. The gas/liquid heat exchanger comprises a heat exchanger core comprised of a stack of core plates, the core comprising a plurality of gas flow passages and a plurality of liquid flow passages arranged in alternating order, a gas inlet manifold and a gas outlet manifold in flow communication with said plurality of gas flow passages, and a liquid inlet manifold and a liquid outlet manifold in flow communication with said plurality of liquid flow passages. A bypass gas flow path extends between the gas inlet and the gas outlet of the valve body and the heat exchanger is located outside the bypass gas flow path. With the valve element in the bypass position, the bypass gas flow path is substantially completely open and flow communication between the gas inlet and the heat exchanger is substantially completely blocked by the valve element; and with the valve element in the heat exchange position, the bypass gas flow path is substantially completely blocked by the valve element, and the gas inlet is in flow communication with the heat exchanger.

BRIEF DESCRIPTION OF THE DRAWINGS

The invention will now be described, by way of example only, with reference to the accompanying drawings, in which.

DETAILED DESCRIPTION

Figure 1:
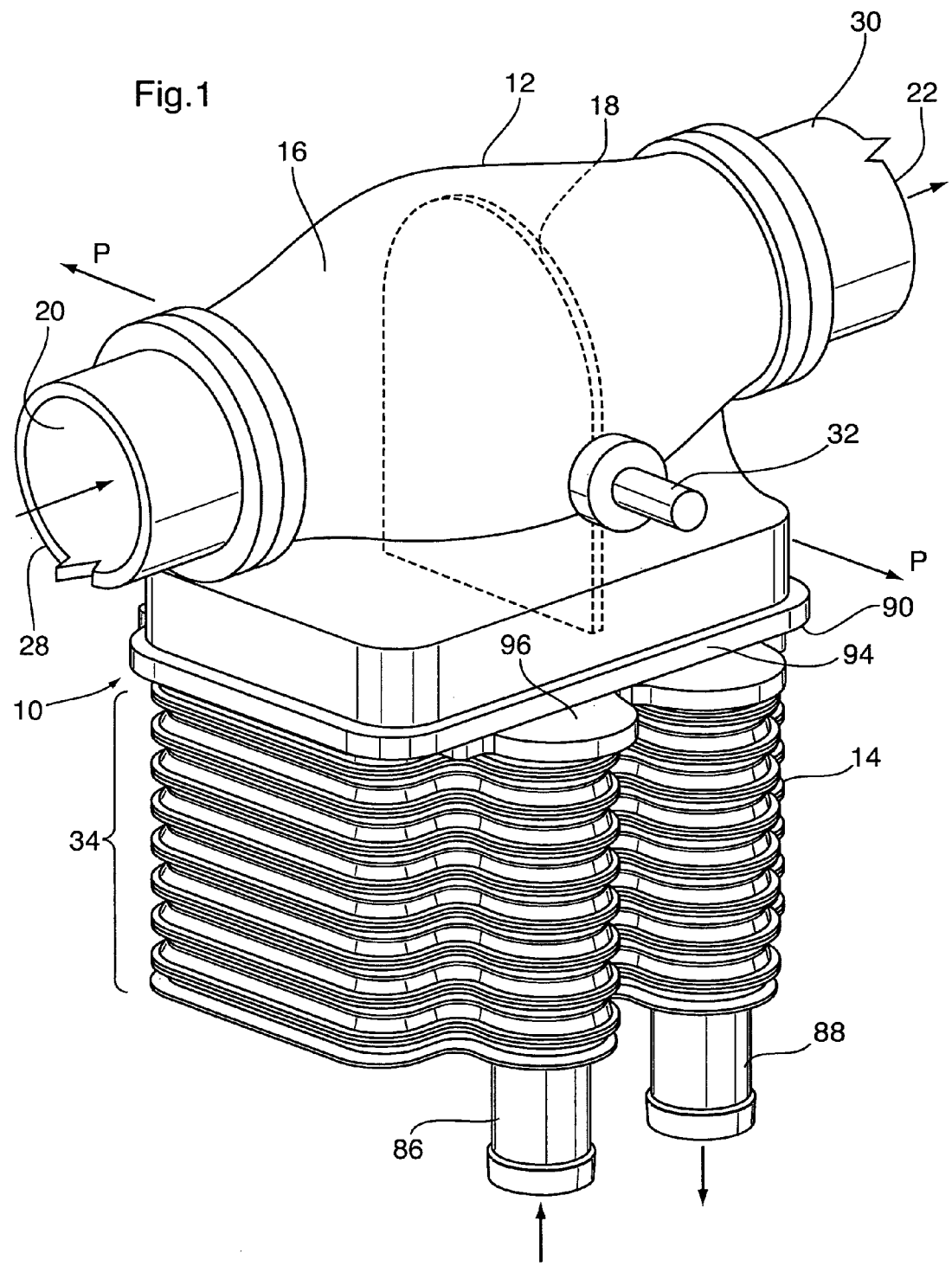
FIG. 1 is a perspective view of heat recovery device according to a first embodiment of the invention.
Figure 2:
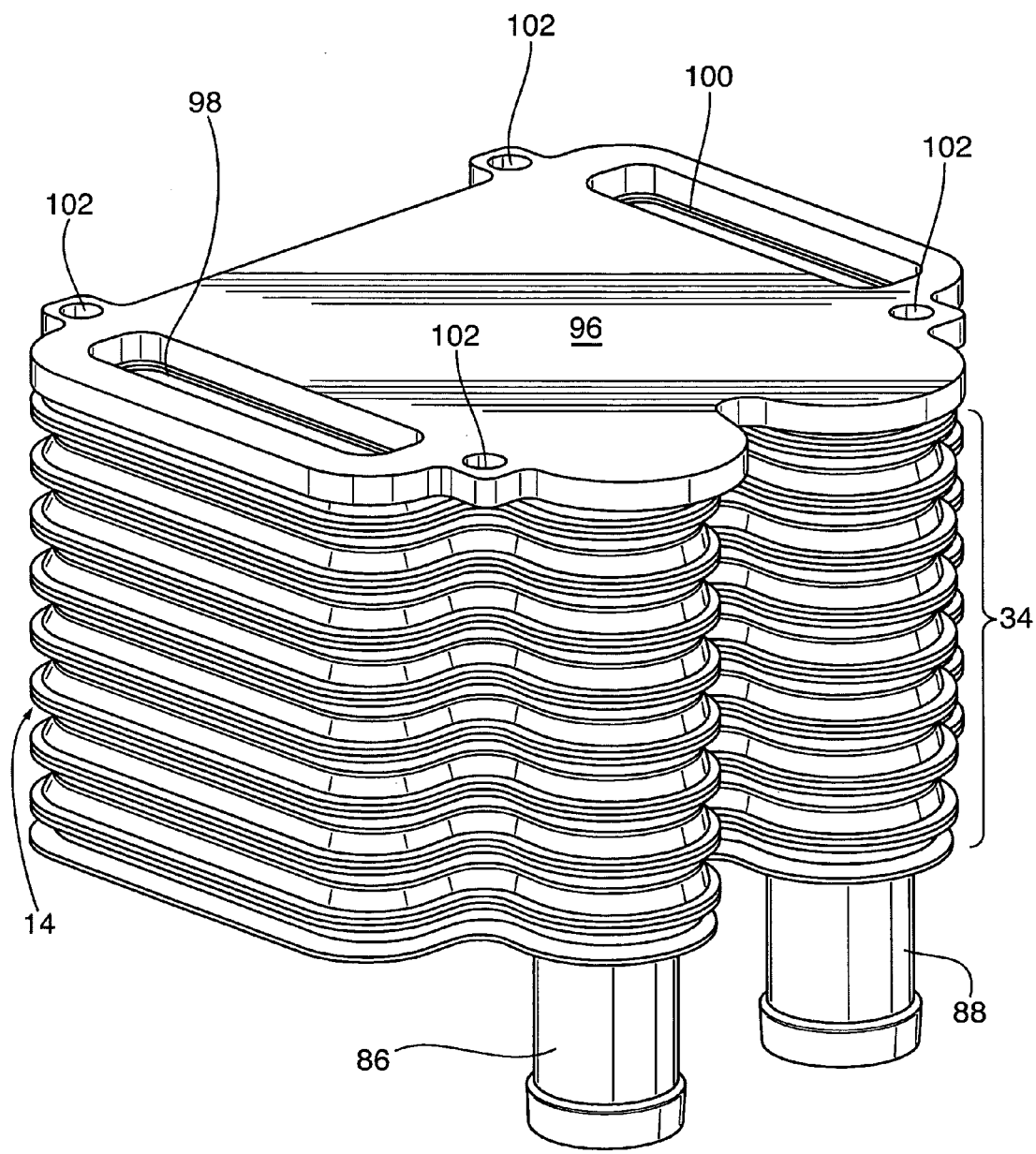
FIG. 2 is a perspective view showing the heat exchanger of the heat recovery device of FIG. 1 in isolation.

A heat recovery device 10 according to a first embodiment of the invention is now described with reference to FIGS. 1 to 9. The heat recovery device 10 may be used as an EGHR device in a motor vehicle exhaust system, and is therefore sometimes referred to herein as EGHR device 10.

The device 10 comprises a gas diverter valve 12 and a gas/liquid heat exchanger 14. The gas diverter valve 12 comprises a valve body 16, a valve element 18 movable between a bypass position shown in FIG. 3 and a heat exchange position shown in FIG. 4. The valve 12 further comprises a gas inlet 20 and a gas outlet 22 formed in the valve body 16.

Where device 10 is used as an EGHR device, the valve 12 may be constructed of one or more metals able to withstand the high operating temperatures within the exhaust gas stream. For example, the valve body 16 may be made from cast iron or steel. Although not necessary, the valve body may be provided with an internal coolant passage for cooling the valve element 18.

The device 10 may be mounted within the exhaust gas stream of a motor vehicle, located in-line with the exhaust pipe downstream of the exhaust manifold and upstream of the tailpipe. A bypass gas flow path 24 is defined as extending directly from the gas inlet 20 to the gas outlet 22 of valve 12. The direction of gas flow within the bypass gas flow path 24 is defined by arrows 26 in FIG. 3. To minimize pressure drop in the bypass mode, the direction of gas flow in the bypass flow path 24 may be the same as the direction of gas flow through the vehicle exhaust system. The gas inlet 20 is shown in the drawings as being connected to an upstream exhaust conduit 28 and the gas outlet 22 is shown in the drawings as being connected to a downstream exhaust conduit 30.

As shown in FIG. 1, the valve element 18 comprises a flat plate which pivots about a pivot axis P which extends through the valve body at an angle of about 90 degrees to the bypass gas flow path 24. The valve element 18 may be mounted on a rod 32, and is rotated in response to temperature of the exhaust gas stream. The rotation of valve element 18 may be controlled by any suitable means, including an electronic solenoid or a temperature-responsive wax motor. The valve element 18 may be of any suitable shape, including circular or oval, or it may have an irregular shape, being rounded along one end (the right end in FIG. 3) to seal with a rounded inside wall of the valve body 16 in the heat exchange mode shown in FIG. 4, and having a flat edge at the opposite end (the left end in FIG. 3) to form a seal against the top of the heat exchanger in the heat exchange mode. An example of this type of shape is shown in FIG. 1.

Figure 3:
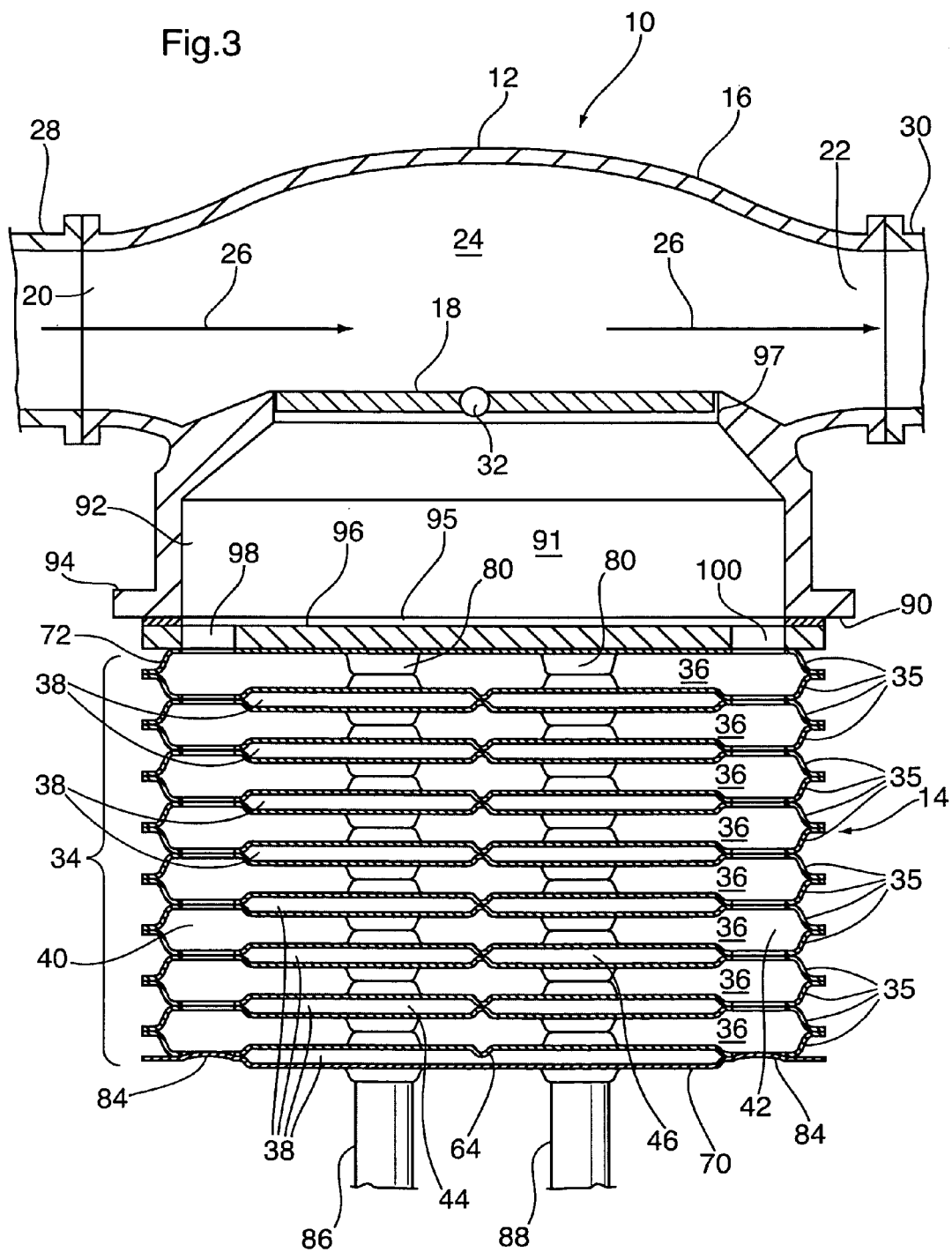
FIG. 3 is a longitudinal cross-section of the heat recovery device of FIG. 1 in a vertical plane, in bypass mode.

With the valve element 18 in the bypass position illustrated in FIG. 3, the bypass gas flow path 24 is substantially completely open so as to minimize pressure drop of the exhaust gas flowing through valve 12. The valve element 18 is not necessarily of the pivoting type, and it will be appreciated that other types of valve elements may be suitable for use in the heat recovery devices according to the invention.

The heat exchanger 14 is located outside the bypass gas flow path 24 for reasons which will become apparent from the description below. The heat exchanger 14 comprises a heat exchanger core 34 including a stack of core plates 35. The core 34 comprises a plurality of gas flow passages 36 and a plurality of liquid flow passages 38 arranged in alternating order. The gas flow passages 36 and the liquid flow passages 38 may be parallel to the bypass gas flow path 24, and are spaced therefrom, and the plates may be horizontally arranged as shown in the drawings, i.e. perpendicular to the vertical plane along which the device 10 is sectioned in FIGS. 3 and 4. Although not shown in the drawings, the interiors of the flow passages 36, 38 may be provided with turbulence-enhancing inserts such as ribs or dimples which may be integrally formed as part of plates 35, or such as corrugated fins or turbulizers which are separately formed and inserted into the passages 36, 38.

Figure 4:
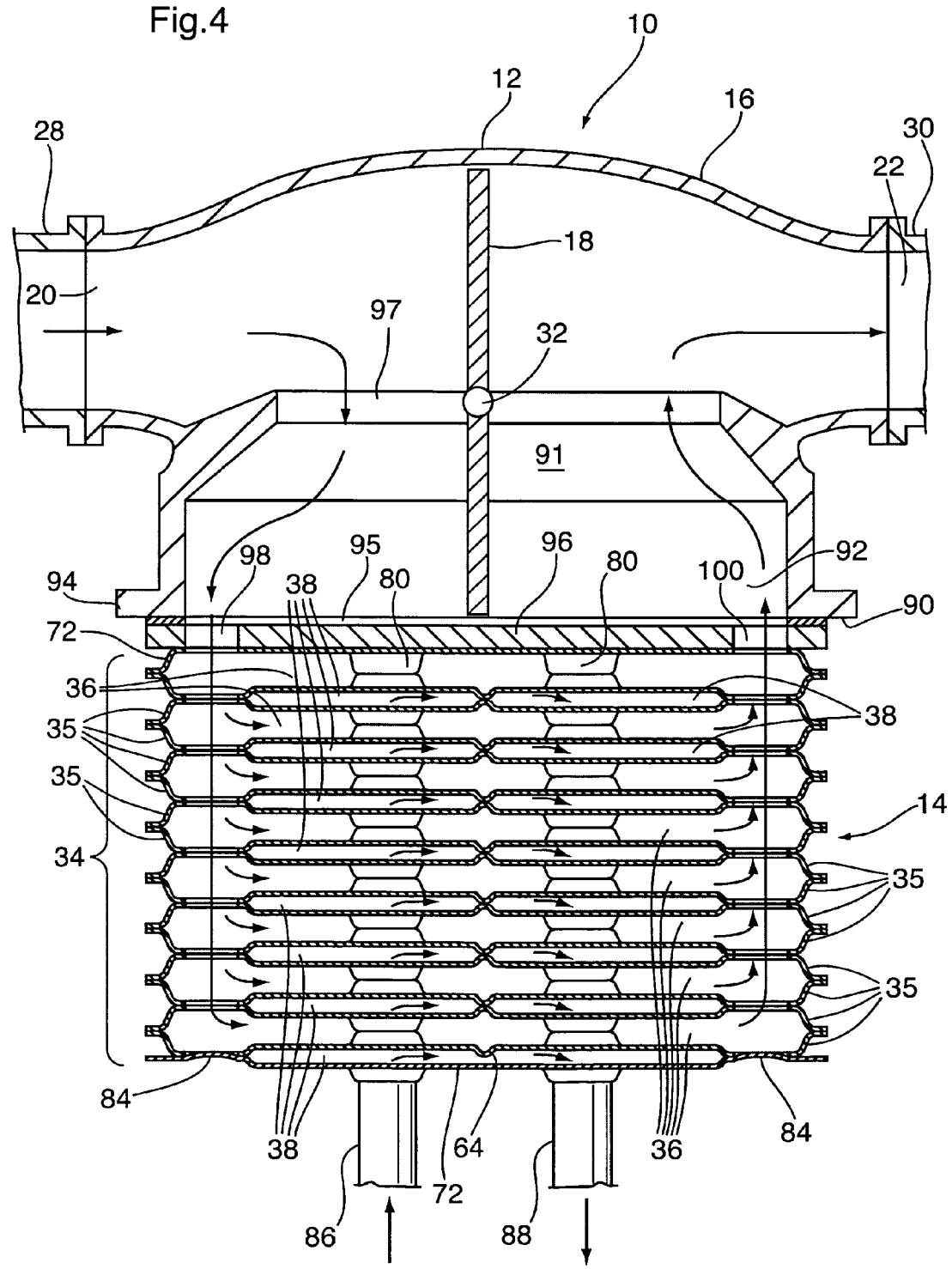
FIG. 4 is a longitudinal cross-section of the heat recovery device of FIG. 1 in a vertical plane, in heat exchange mode.

A plurality of manifolds extend through the core 34, and may be substantially perpendicular to the bypass gas flow path 24, parallel to the vertical plane in which device 10 is sectioned in FIGS. 3 and 4. Device 10 includes four such manifolds, namely a gas inlet manifold 40 and a gas outlet manifold 42 in flow communication with the gas flow passages 36; and a liquid inlet manifold 44 and a liquid outlet manifold 46 in flow communication with the liquid flow passages 38.

With the valve element 18 in the bypass position as shown in FIG. 3, flow communication between the gas inlet 20 and the heat exchanger 14 is substantially completely blocked, while the bypass gas flow path 24 is substantially completely open. Therefore, with the valve element 18 in the bypass position, substantially all the exhaust gas flows through the bypass gas flow path 24 between the gas inlet 20 and the gas outlet 22, and there will be little or no flow of exhaust gas through the heat exchanger 14.

Conversely, with the valve element 18 in the heat exchange position as shown in FIG. 4, the bypass gas flow path 24 is substantially completely blocked, while flow communication is permitted between the gas inlet 20 and heat exchanger 14, and optionally between the gas outlet 22 and heat exchanger 14.

Figure 5:
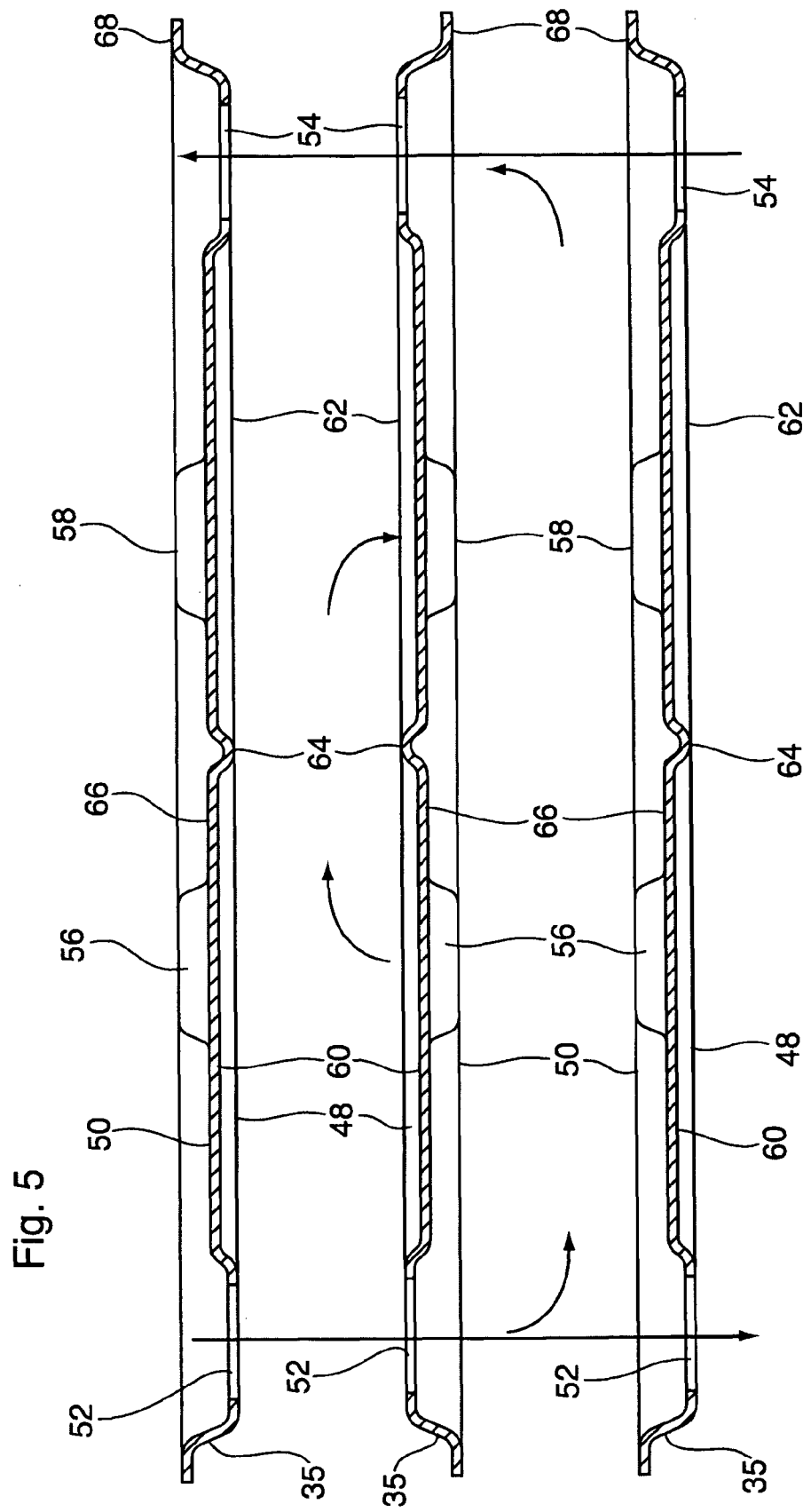
FIG. 5 are cross-sectional side views through the gas manifold openings of a plurality of heat exchanger plates, the sections being taken along line 5-5 of FIG. 7.
Figure 6:
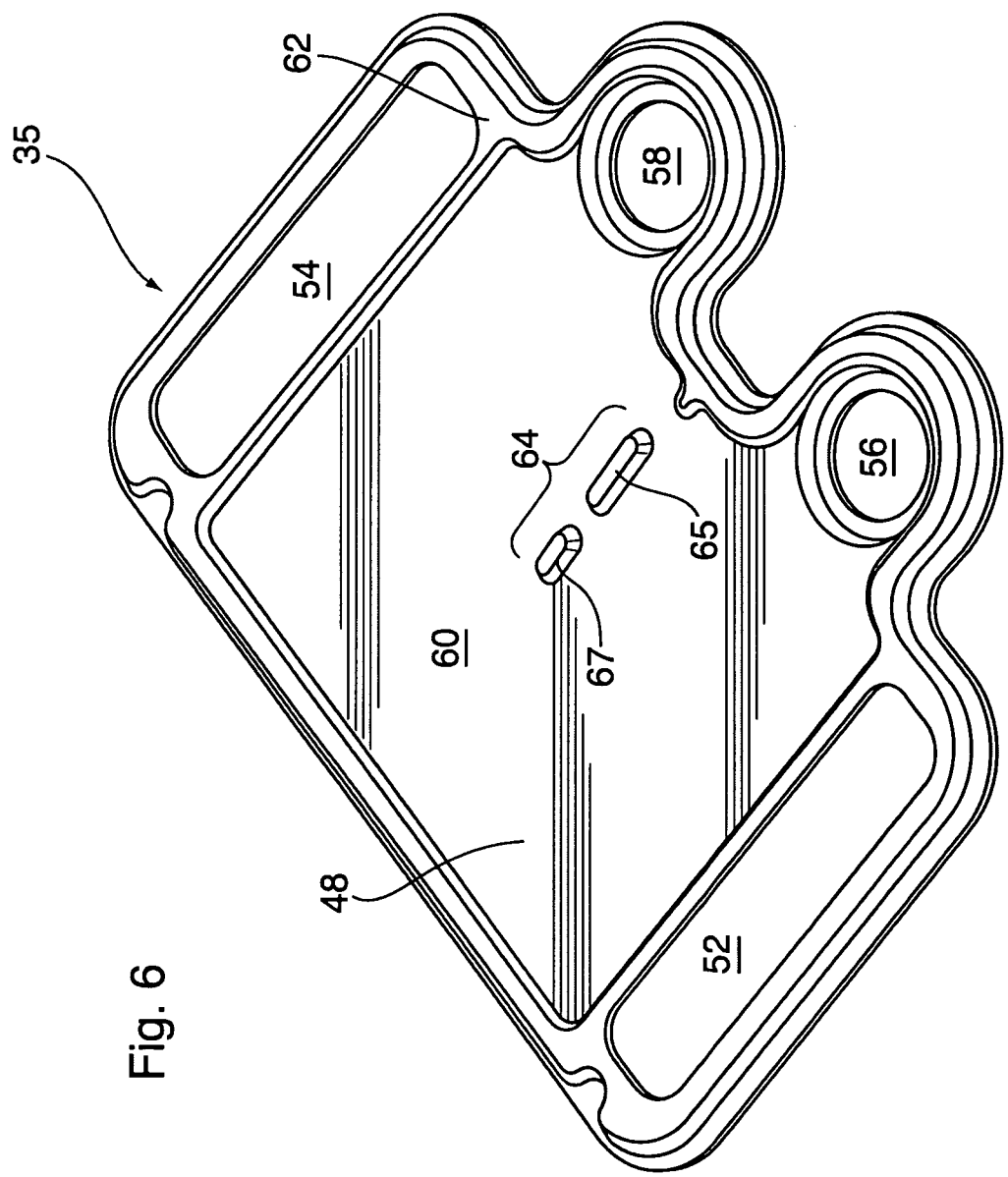
FIG. 6 is a perspective view of the coolant side of a core plate in the heat exchanger.
Figure 7:
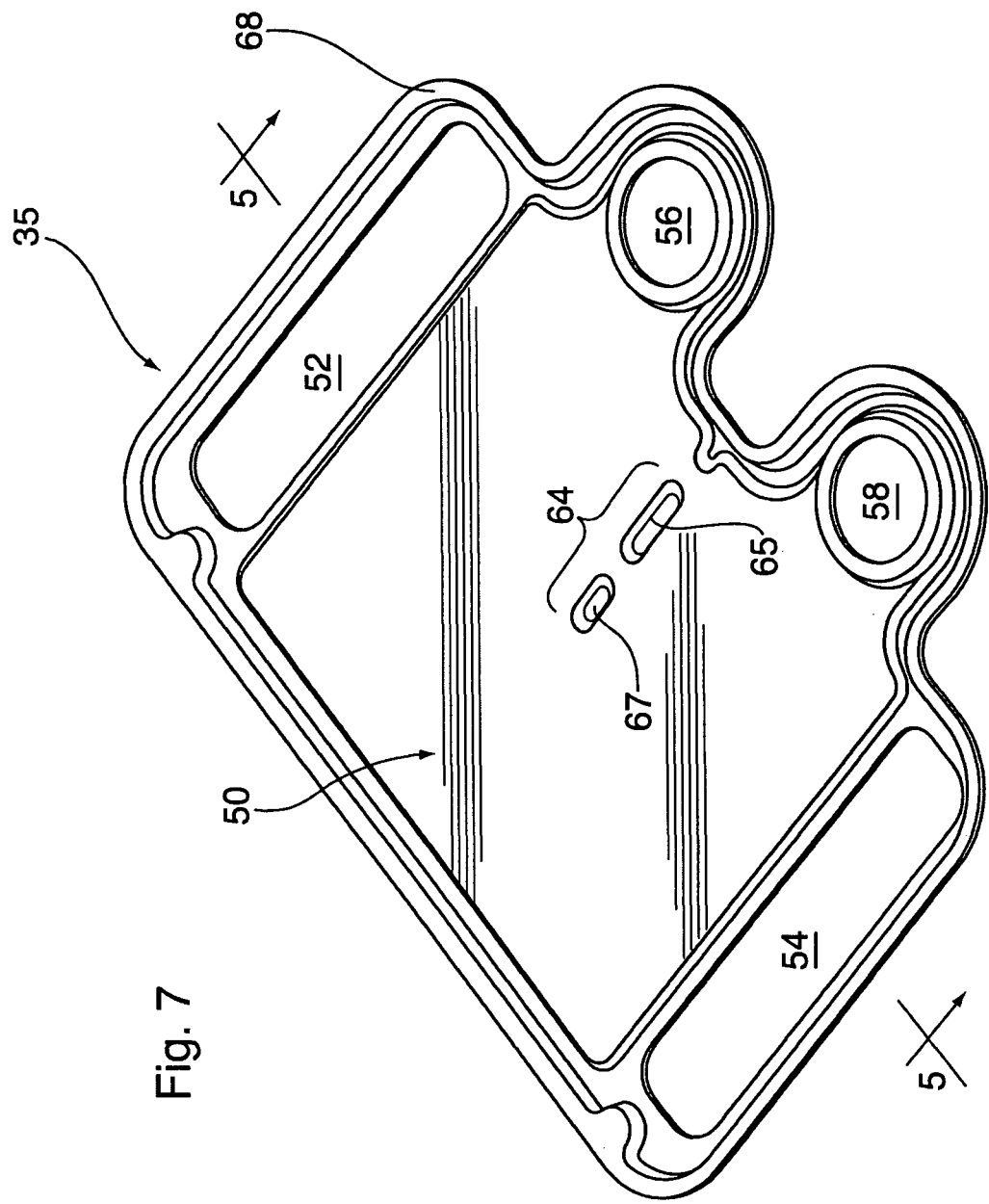
FIG. 7 is a perspective view of the gas side of a core plate in the heat exchanger.

As mentioned above, the core 34 includes a plurality of core plates 35 which may be identical to one another. The two sides of a core plate 35 are illustrated in FIGS. 6 and 7, and the relative orientations of a plurality of plates 35 in the core 34 are shown in FIG. 5. FIG. 6 illustrates the "liquid side" 48 of a core plate 35 and FIG. 7 illustrates the opposite "gas side" 50 of the same core plate 35. The liquid side 48 denotes the side of plate 35 which defines, in part, one of the liquid flow passages 38, while the gas side 50 denotes the side of plate 35 which defines, in part, one of the gas flow passages 36.

Except for the core plates 35 located at the extreme top and bottom of the core 34, all the core plates 35 are sealingly joined together in the core 34 with the gas side 50 of each core plate 35 facing the gas side 50 of an adjacent core plate 35, and with the liquid side 48 of each core plate 35 facing the liquid side 48 of an adjacent core plate 35. This arrangement is illustrated in FIG. 5, showing the relative orientations of three consecutive core plates 35 of heat exchanger 14.

Each of the core plates 35 has two liquid manifold openings and two gas manifold openings. Specifically, each plate includes a gas inlet manifold opening 52, a gas outlet manifold opening 54, a liquid inlet manifold opening 56 and a liquid outlet manifold opening 58. When the plates 35 are stacked to form core 34, the manifold openings 52, 54, 56 and 58 in plates 35 are aligned in order to form the corresponding manifolds 40, 42, 44 and 46, respectively.

In plates 35, the liquid inlet and outlet manifold openings 56, 58 are shown as being side-by-side, and the gas inlet and outlet manifold openings 52, 54 are shown as being located at opposite ends of the plates 35. It will be appreciated that the shapes, sizes and arrangement of openings 52, 54, 56, 58 in plates 35 shown in the drawings are dictated by a number of factors which may be specific to particular applications, including packaging requirements, and may be altered without departing from the scope of the present invention.

On the liquid side 48 of plate 35, the liquid inlet manifold opening 56 and the liquid outlet manifold opening 58 are shown as being recessed relative to a planar base 60 of plate 35, over which the liquid flows through the liquid flow passage 38. As a consequence, the liquid inlet manifold opening 56 and the liquid outlet manifold opening 58 of heat exchanger 14, as well as the liquid inlet manifold 44 and liquid outlet manifold 46, are in flow communication with the liquid flow passage 38. Also on the liquid side 48 of plate 35, the gas inlet manifold opening 52 and the gas outlet manifold opening 54 are shown as being raised relative to the planar base 60, and are coplanar with a liquid side sealing surface 62 which includes a central portion surrounding the planar base 60 and liquid manifold openings 56, 58, and two edge portions which completely surround the gas manifold openings 52, 54. Thus, when the liquid side sealing surface 62 of one plate 35 is sealed to the liquid side sealing surface 62 of an adjacent plate 35, there is no flow communication between the planar base 60 and the gas manifold openings 52, 54.

As shown in FIG. 6, the liquid flow passage 38 is U-shaped, with a rib 64 extending part way across the base 60 to prevent short-circuiting of liquid flow between the liquid inlet manifold opening 56 and the liquid outlet manifold opening 58. The rib 64 may be co-planar with the liquid side sealing surface 62 so as to contact a rib 64 of an adjacent plate 35 as shown in FIG. 3. The rib 64 may be discontinuous as shown in FIG. 6 so as to provide good distribution of liquid flow across the planar base 60. For example, the rib 64 in FIG. 6 includes two portions 65 and 67 of different lengths, with portion 65 being longer than portion 67. While most of the flow across the planar base 60 flows around the end of rib 64, it will be appreciated that a portion of the flow will pass through the gaps to either side of rib portion 65. While the gaps in rib 64 permit some short-circuiting of flow through rib 64, the inventors have found that the flow pattern produced by the discontinuous rib 64 is desirable as it provides a well distributed flow of the liquid across the planar base 60, thereby enhancing heat transfer.

The gas side 50 of plate 35 is shown in FIG. 7, and has a profile which is the reverse of the liquid side 48. In particular, the gas flows across a planar base 66, which partially defines the gas flow passage 36, from the gas inlet manifold opening 52 to the gas outlet manifold opening 54. The openings 52, 54 are recessed relative to the planar base 66 and therefore the gas inlet and outlet manifold openings 52, 54 and the corresponding gas inlet and outlet manifolds 40, 42 are in flow communication with the gas flow passages 36. The gas side 50 of plate 35 has a planar sealing surface 68 which extends about the periphery of gas side 50 for sealing to a sealing surface 68 of an adjacent plate 35 in the core 34. Meanwhile, the liquid inlet and outlet manifold openings 56, 58 on the gas side 50 are raised above the planar base 66 and are coplanar with the sealing surface 68, for sealing to the respective openings 56, 58 in an adjacent plate 35. Therefore, there is no flow communication between the planar base 66 and the liquid manifold openings 56, 58.

Core plates 35 in the core 34 may be identical in order to reduce manufacturing costs and simplify assembly. The core plates at the top and bottom of the core 34 may, however, have different configurations, and are briefly discussed below.

The top plate 70 of core 34 is defined herein as the core plate which is farthest (distal) from the valve 12, while the bottom plate 72 is defined herein as the core plate which is closest (proximal) to the valve 12.

Figure 8:
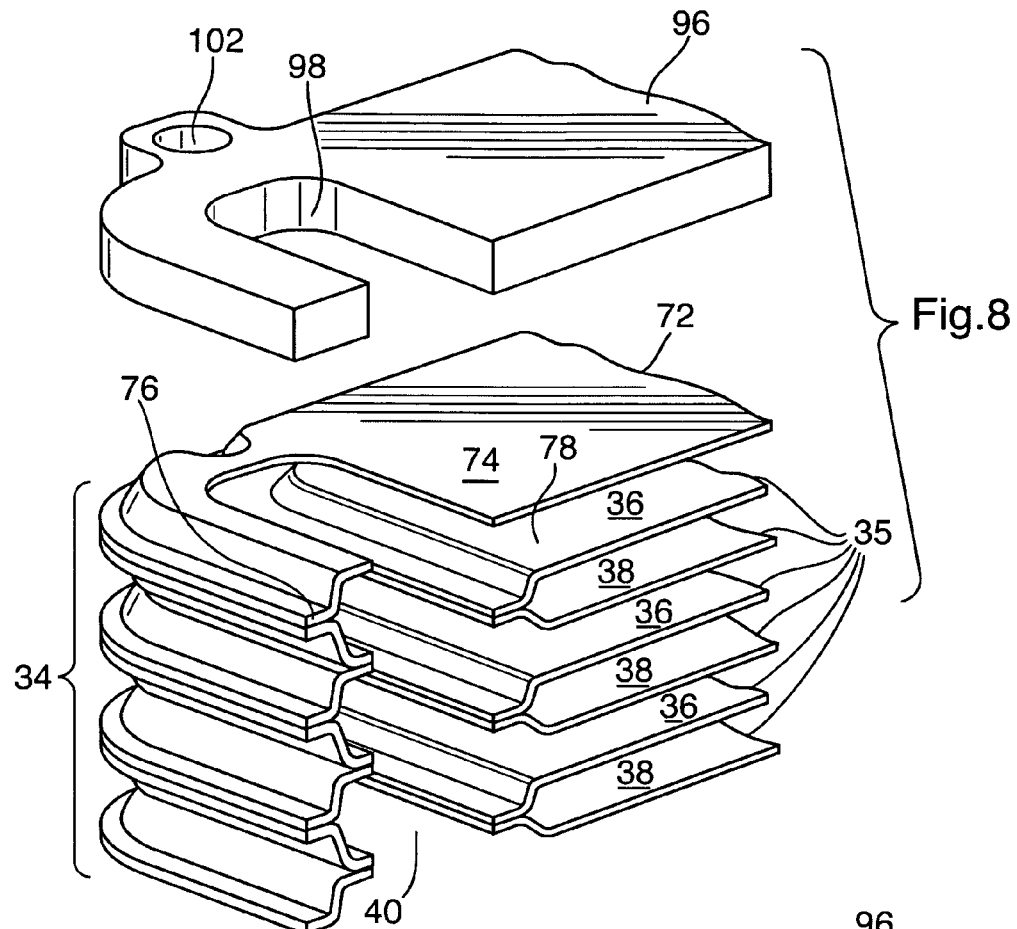
FIG. 8 is a perspective longitudinal cross-section through a portion of the core of the heat exchanger, showing the mounting plate separated from the core.
Figure 9:
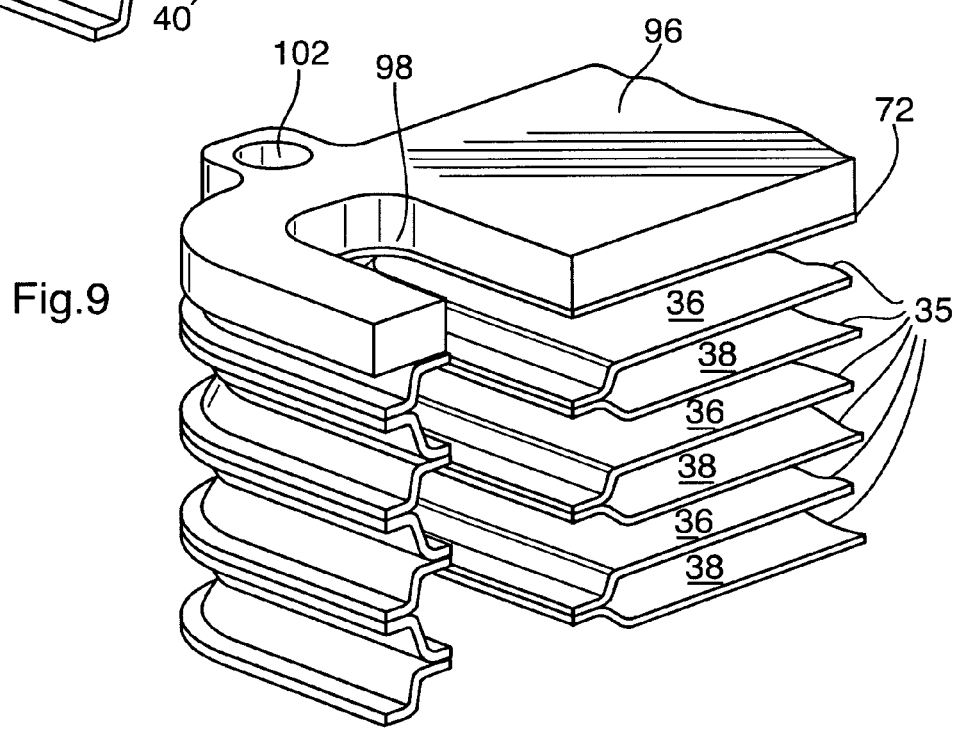
FIG. 9 is similar to FIG. 8, except that the mounting plate is shown as being attached to the bottom of the core.

As best seen in the cross-sections of FIGS. 3, 4 and 8, the bottom plate 72 has a configuration which differs somewhat from core plates 34. In particular, the bottom plate 72 includes a gas inlet manifold opening 52 and a gas outlet manifold opening 54 which are co-planar with a base 74. The openings 52, 54 and the base 74 are recessed relative to a planar sealing surface 76 of plate 72, and therefore when the bottom plate 72 is sealed to the gas side 50 of an adjacent plate 35 with its sealing surface 76 sealed against the gas side sealing surface 68 of the adjacent core plate 35, a bottom-most gas flow passage 78 is defined at the bottom of core 34, between bottom plate 72 and an adjacent core plate 35. The bottom plate may also be formed with a pair of imperforate bosses 80 which are coplanar with the sealing surface 76 of bottom plate 72, and which seal against the liquid inlet and outlet manifold openings 56, 58 of the adjacent core plate 35, thereby closing the bottom of the liquid inlet and outlet manifolds 44, 46.

The core 34 further includes a top core plate 82 located at the top of core 34. The top core plate 82 includes a liquid inlet manifold opening 56 and a liquid outlet manifold opening 58 which are in flow communication with a top-most liquid flow passage 36 formed between the top plate and the liquid side 48 of an adjacent core plate 35. The top core plate 82 further includes depressed portions 84 adjacent to its edges which seal against the gas inlet and outlet manifold openings 52, 54 of the adjacent core plate 35, and thereby close the top of the gas inlet and outlet manifolds 40, 42. The liquid inlet and outlet manifold openings 56, 58 may be provided with a respective liquid inlet fitting 86 and liquid outlet fitting 88 through which the liquid enters and leaves the heat exchanger 14.

As shown in FIGS. 3 and 4, the valve body 16 has a sealing surface 90 along which the valve body 16 is secured to the heat exchanger 14, and more specifically to the bottom plate 72 of heat exchanger 14. The sealing surface 90 surrounds an opening 92 in the valve body 16 through which flow communication is provided between the interior of the valve body 16 and the heat exchanger 14. In the illustrated embodiment, the sealing surface 90 is planar and comprises a flange 94 surrounding the base of the valve body 16. The sealing surface 90 may be spaced from the valve element 18 such that a closed chamber 91 is formed inside the valve body 16, between the bypass gas flow path 24 and the sealing surface 90, when the valve element 18 is in the bypass position shown in FIG. 3. This closed chamber 91 provides a buffer space between the hot exhaust gas flowing through bypass gas flow path 24 and the relatively cool heat exchanger 14.

The bottom plate 72 may be directly joined to the sealing surface 90 of valve body 16, for example by brazing or welding. However, in the illustrated embodiment, a mounting plate 96 is provided inbetween the bottom plate 72 and the sealing surface 90. The plate 96 may be secured to the bottom plate 72 by any convenient means, such as by welding, brazing or by means of mechanical fasteners. In one embodiment of the invention, the mounting flange is brazed to the bottom plate 72, and is secured to the valve body 16 by means of mechanical fasteners such as bolts (not shown). For this purpose the peripheral edges of the mounting plate 96 may be provided with a plurality of bolt holes 102. This arrangement may be advantageous where, for example, the valve body 16 and the heat exchanger 14 are made of dissimilar metals which are difficult to braze or weld together. In this regard, the core plates 35 of heat exchanger 14 may be constructed from stainless steel plates, whereas the valve body 16 may be cast iron.

The mounting plate 96 is also provided with a gas inlet manifold opening 98 and a gas outlet manifold opening 100, the openings 98, 100 being spaced apart from one another in the direction of bypass flow. The openings 98, 100 are aligned with the respective gas inlet manifold 40 and gas outlet manifold 42 of the core 34 so as to provide communication between the interior of the valve body 16 and the gas inlet and outlet manifolds 40, 42 of the heat exchanger 14.

The mounting flange 94 may include a layer of thermally insulating material so as to minimize conduction of heat from the valve body 16 to the heat exchanger 14. This thermally insulating layer may take the form of a gasket 95 provided between the mounting plate 96 and the sealing surface 90 of valve body 16.

The operation and benefits of the device 10 for exhaust gas heat recovery (EGHR) are now described below. When used for EGHR, the device 10 transfers heat from the gas to the liquid, the gas being a hot engine exhaust gas, and the liquid being a liquid coolant, for example a water/glycol engine coolant circulating in the vehicle's cooling system.

Upon cold start-up of the vehicle engine, the valve element 18 is actuated so as to adopt the configuration shown in FIG. 4, referred to herein as the heat exchange position or the heat exchange mode. In this position, the valve element 18 substantially completely blocks the bypass gas flow path 24, with the edges of the valve element 18 substantially sealing with the interior walls of the valve body 16 and with a surface of the mounting flange 96. In order to maximize efficiency of EGHR device 10 it is desirable that substantially all of the exhaust gas is diverted from the gas inlet 20 of valve 12 to the gas inlet manifold 40 of heat exchanger 14, and the amount of exhaust gas which leaks past the valve element 18 in the heat exchange position is desirably kept to a minimum, as practicable.

Upon cold start-up, the exhaust gases are initially relatively cool and gradually warm up to normal operating temperature. During this time, the heat exchanger 14 and the coolant circulating therein are gradually heated by the exhaust gases. Since the heat exchanger 14 is warmed up gradually, the thermal stresses on the heat exchanger 14 during warm-up are relatively minor. During warm-up, the heat exchanger 14 extracts heat from the exhaust gases and transfers it to the liquid coolant. The coolant then flows to other vehicle components, such as a heater core for heating the passenger compartment and for defrosting windows, or to a reservoir for engine or transmission oil, in order to warm and reduce the viscosity of the oil.

After initial start-up, once the heat from the vehicle exhaust gases is no longer required, the valve element 18 is actuated so as to bring it to the position shown in FIG. 3, referred to herein as the bypass position or the bypass mode. In this position, the flow through the bypass gas flow path 24 is maximized so as to minimize pressure drop and flow through the heat exchanger 14 is minimized so as to prevent further heat transfer from the exhaust gas to the liquid coolant. In order to maximize efficiency of EGHR device 10 it is desirable that substantially all of the exhaust gas flows through the bypass gas flow path 24, and that the exhaust gas does not flow through the heat exchanger 14. For example, the amount of exhaust gas which leaks past the valve element 18 in the bypass position and enters heat exchanger 14 is desirably kept to a minimum, as practicable. This minimizes the additional load on the cooling system caused by unwanted heat exchanger between the exhaust gas and the coolant circulating through heat exchanger 14, and also serves to minimize potentially damaging thermal stresses resulting from unnecessary heating of the heat exchanger 14.

In order to further minimize heat transfer from the exhaust gas to the coolant in the bypass position, it can be seen that the edges of valve element 18 are substantially sealed against an interior surface 97 of the valve body 16, thereby minimizing unwanted gas flow to the heat exchanger 14. Also, the heat exchanger 14 is located outside of the bypass flow path 24 and may be spaced therefrom by chamber 91, which also helps to prevent unwanted heat transfer from the exhaust gas to the coolant. Also, as mentioned above, an insulating gasket 95 is provided between the mounting plate 96 and the valve body 16 so as to minimize heat transfer from valve 12 to heat exchanger 14 via conduction. All of these features are expected to contribute to a reduction in thermal stresses experienced by the heat exchanger 14.

Also, in contrast to the other gas flow passages 36 in core 34, the bottom-most gas flow passage 36 formed by bottom plate 72 and adjacent core plate 35 does not have liquid flow passages 38 on both sides. In particular, there is no liquid flow passage 38 between the bottom-most gas flow passage 36 and the mounting flange 96. This helps to further minimize thermal stresses which could result if the coolant in a liquid flow passage 38 located at the bottom of the heat exchanger 14 were in contact with the mounting plate 96.

A further advantage of the device 10 is flexibility. It will be appreciated that the heat exchanger 14 may be sized differently for different applications. Since the heat exchanger 14 is "self-enclosing", i.e. does not include an external housing, and since the plates 35 are stacked horizontally relative to a longitudinal vertical plane through device 10 (i.e. the plane of the cross-sections in FIGS. 3 and 4), the heat exchanger 14 can be made larger or smaller simply by adding or subtracting plates 35 from the core 34, without affecting the configuration of the valve 12. This is advantageous since the same heat exchanger core plates 35 can be used in a variety of different heat exchangers having different heat transfer requirements. For example, differently sized vehicles have passenger compartments of different sizes, and vehicles with larger passenger compartments may have greater heat transfer requirements. All that is needed to adjust the overall heat transfer requirements is to modify the heat exchanger 14 by adding or removing core plates 35.

A heat recovery device 110 according to a second embodiment of the invention is now described below with reference to FIGS. 10 and 11. Most of the elements of device 110 are also included in device 10 and have already been described above, and further description of these elements is unnecessary. The elements which are shared by heat recovery devices 10 and 110 are identified by like reference numerals in the drawings.

As mentioned above, the leakage of exhaust gas past the valve element 18 is desirably minimized in the heat exchange position. In this position, one edge of the valve element 18 must seal against the heat exchanger 14, more specifically against the bottom of the heat exchanger 14, or against the mounting plate 96 where one is used. In the present embodiment, heat recovery device 110 includes a mounting plate 96 at the bottom of heat exchanger 14. As the mounting plate 96 is flat, it will be appreciated that the edge of valve element 18 which seals against the mounting plate 96 will also be flat.

Figure 10:
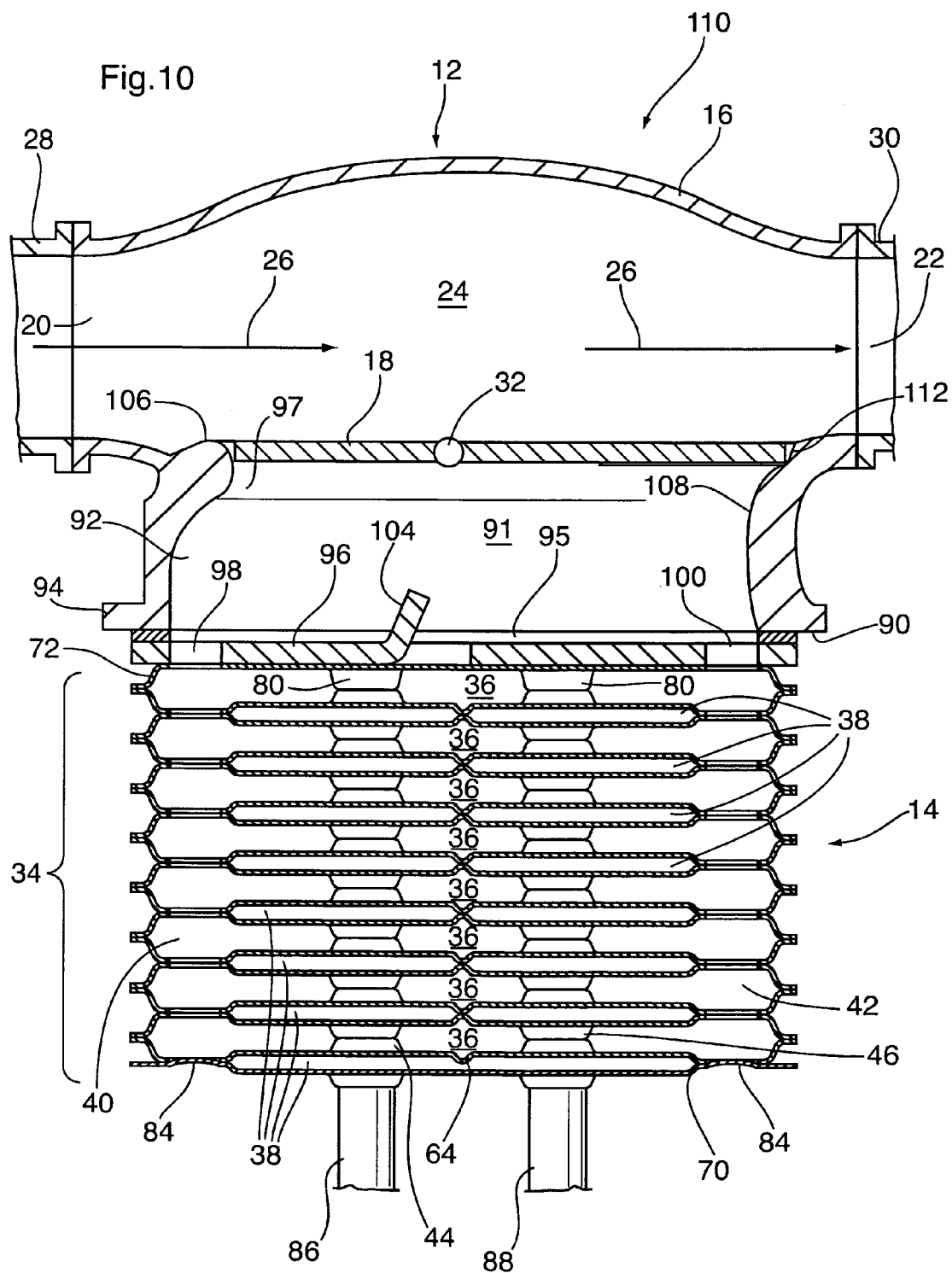
FIG. 10 is a longitudinal cross-section of a heat recovery device according to a second embodiment in a vertical plane, in bypass mode.
Figure 11:
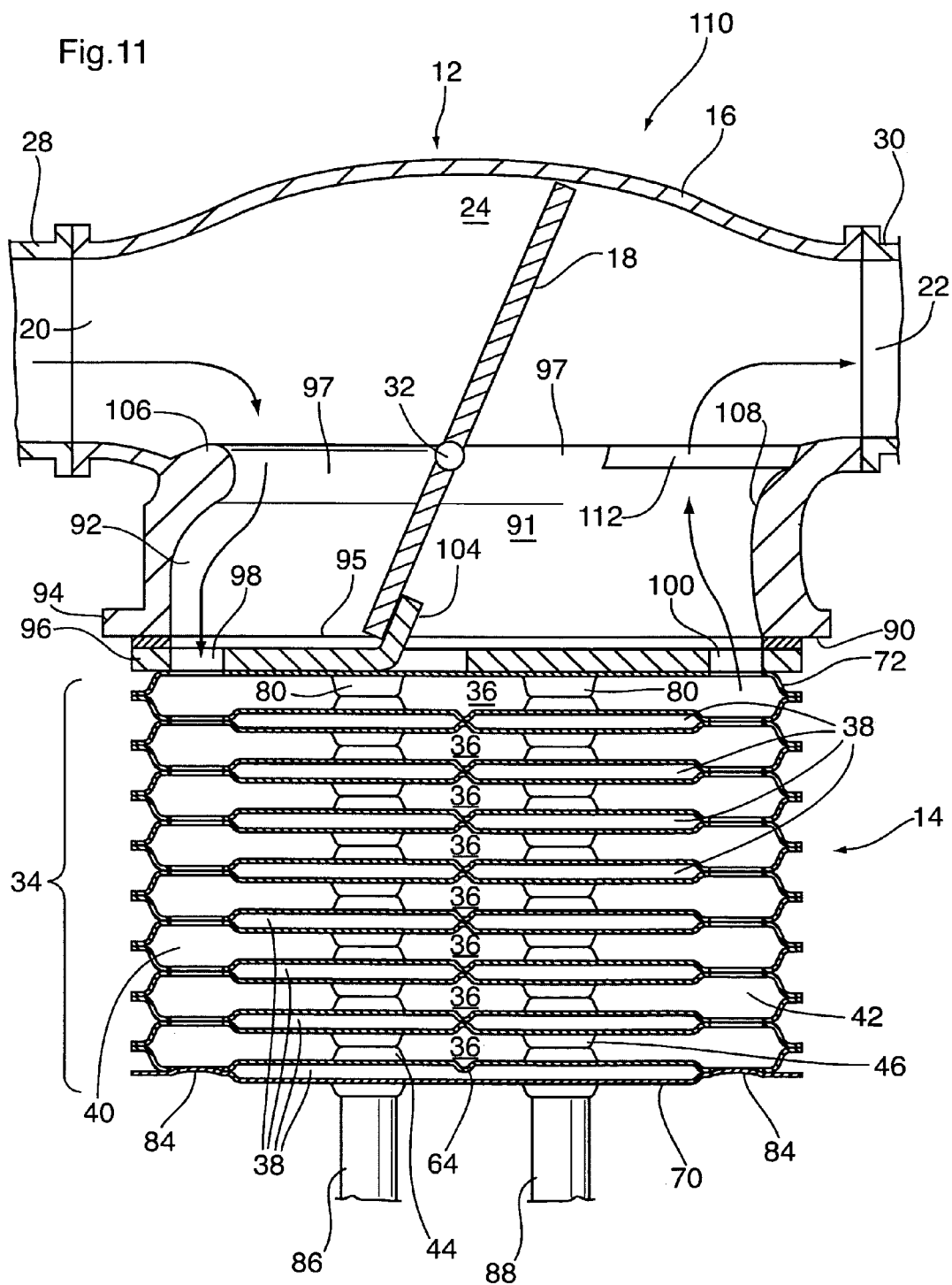
FIG. 11 is a longitudinal cross-section of the heat recovery device of FIG. 10 in a vertical plane, in heat exchange mode.

In order to improve sealing of the valve element 18, the mounting plate 96 may be provided with an upstanding flange or tab 104 as shown in FIGS. 10 and 11, bent upwardly from the body of the mounting plate 96 so as to provide a more effective lap seal with the valve element 18. The tab 104 does not add to the weight of the device 110 since it comprises material which is part of the mounting plate 96. The tab 104 may have a rectangular shape, with a long dimension along the extending along the width of the valve element 18. The tab 104 may be angled by less than 90 degrees relative to a horizontal axis defined by the direction of the bypass gas flow path 24, more typically from about 45 to less than 90 degrees, and is angled away from a vertical axis in the direction of gas flow. It can be seen by comparing the heat exchange position of device 110 (FIG. 11) with the heat exchange mode of device 10 (FIG. 4), that the tab 104 overlaps the valve element 18, potentially providing a better seal than in device 10, and also reduces the stroke of the valve element 18 during opening and closing of the bypass gas flow path. The tab 104 also eliminates any effect that a variation in the thickness of gasket 95 may have on the seal between valve element 18 and mounting plate 96. In other words, a smaller amount of rotation is required to seal the valve element 18 against tab 104 than is required to seal against the horizontal portion of mounting plate 96. The tab 104 also eliminates any effect that a variation in the thickness of gasket 95 may have on the seal between valve element 18 and mounting plate 96. The angle of the tab 104 is selected so as to lie flat against the surface of valve element 104 in the heat exchange mode, as shown in FIG. 11. Also, in order to reduce the stroke of the valve element 18, it is desirable that the tab 104 is located toward the gas inlet manifold opening 98 of the mounting plate 96.

Another difference between heat recovery devices 10 and 110 can be seen in the shapes of the interior surfaces of the valve body 16 along which the exhaust gases flow into and out of the heat exchanger 14 when the valve element 18 of device 110 is in the heat exchange position, as shown in FIG. 11. It can be seen that the interior surface 97 against which the valve element 18 seals in the bypass position is modified somewhat by providing a rounded inlet surface 106 which still protrudes into the interior of valve body 16, but by a lesser amount than the corresponding portion of surface 97 shown in FIGS. 3 and 4. The interior surface 97 is similarly provided with a rounded outlet surface 108 along which the gases flow from the gas outlet manifold 42 of heat exchanger 14 toward the gas outlet 20 of valve 12. In particular, the rounded outlet surface 108 is gently curved and does not have any inwardly extending protrusion or lip, in contrast to the corresponding portion of surface 97 shown in FIGS. 3 and 4. The inventors have found that it is particularly important to provide a gently rounded surface between heat exchanger 14 and outlet 20 in order to minimize pressure drop through device 110.

The surfaces 106, 108 are formed without undue thinning of the walls of valve body 16 so as to avoid weakening, and in FIGS. 10 and 11 these surfaces are shown as being substantially thicker than other walls of valve body 16. It will be appreciated that the interior and exterior surfaces of the valve body 16 may be contoured so as to provide appropriate wall thicknesses throughout the valve body.

In order to avoid impairment of the sealing ability of valve element 18 against surface 97, particularly in the bypass mode where leakage of hot gases to the heat exchanger 14 is to be minimized, it may be desired to provide at least one of the surfaces 106, 108 with a small indentation or lip so as to enhance the seal with surface 97 in the bypass mode. In FIGS. 10 and 11 the rounded outlet surface 108 is provided with such an indentation 112 to enhance the seal with the valve element 108.

Although the invention has been described in connection with certain preferred embodiments, it is not limited thereto. Rather, the invention includes all embodiments which may fall within the scope of the following claims.

What is claimed is:

1. A heat recovery device comprising a gas diverter valve and a gas/liquid heat exchanger;
    the gas diverter valve comprising a valve body; a valve element movable between a bypass position and a heat exchange position; and a gas inlet and a gas outlet formed in the valve body;
    the gas/liquid heat exchanger comprising a heat exchanger core comprised of a stack of core plates, the core comprising a plurality of gas flow passages and a plurality of liquid flow passages arranged in alternating order, a gas inlet manifold and a gas outlet manifold in flow communication with said plurality of gas flow passages, and a liquid inlet manifold and a liquid outlet manifold in flow communication with said plurality of liquid flow passages;
    wherein a bypass gas flow path extends between the gas inlet and the gas outlet of the valve body and the heat exchanger is located outside the bypass gas flow path;
    wherein, with the valve element in the bypass position, the bypass gas flow path is substantially completely open and flow communication between the gas inlet and the heat exchanger is substantially completely blocked by the valve element; and
    with the valve element in the heat exchange position, the bypass gas flow path is substantially completely blocked by the valve element, and the gas inlet is in flow communication with the heat exchanger;
    wherein the core includes a plurality of core plates, each of the core plates having two liquid manifold openings and two gas manifold openings, wherein each of the core plates has a gas side and a liquid side, and wherein the core plates are sealed together in the core such that each of the gas flow passages is defined between the gas sides of two adjacent core plates and each of the liquid flow passages is defined between the liquid sides of two adjacent core plates, and such that the manifold openings in the plates align to form said manifolds, with the gas inlet and outlet manifolds in flow communication with the gas flow passages and the liquid inlet and outlet manifolds in flow communication with the liquid flow passages;
    wherein a bottom of said core is proximate to the valve body and a top of said core is distal to the valve body, and wherein the core includes a bottom core plate located at the bottom of the core;
    wherein the bottom core plate includes one of said gas inlet manifold openings and one of said gas outlet manifold openings;
    wherein a bottom-most gas flow passage is defined between the bottom plate and an adjacent one of said core plates; and
        wherein said bottom-most gas flow passage is in direct heat exchange contact with only one of said liquid flow passages.

2. The heat recovery device according to claim 1, wherein all of the core plates except the core plates at the top and bottom of the stack are identical.

3. The heat recovery device according to claim 1, wherein the bottom plate forms a closed bottom of the liquid inlet manifold and a closed bottom of the liquid outlet manifold.

4. The heat recovery device according to claim 1, wherein a bottom of said core is proximate to the valve body and a top of said core is distal to the valve body, and wherein the core includes a top core plate located at the top of the core;
    wherein the top core plate includes a liquid inlet manifold opening and a liquid outlet manifold opening and forms a closed top of the gas inlet manifold and a closed top of the gas outlet manifold; and
    wherein the liquid inlet manifold opening of the top core plate is provided with a liquid inlet fitting and the liquid outlet manifold opening of the top core plate is provided with a liquid outlet fitting.

5. The heat recovery device according to claim 1, wherein the gas inlet and outlet manifolds and the liquid inlet and outlet manifolds are substantially perpendicular to the bypass gas flow path, and wherein the gas flow passages and the liquid flow passages are substantially parallel to the bypass gas flow path.

6. The heat recovery device according to claim 1, wherein the liquid inlet manifold opening and the liquid outlet manifold opening are provided along one side of the core plate, wherein the liquid flow passages are U-shaped, and wherein a rib separates the liquid inlet and outlet manifold openings to prevent short-circuiting flow between the manifold openings; and wherein the rib is discontinuous, and provides gaps through which a portion of the liquid is able to flow through the rib.

7. The heat recovery device according to claim 1, wherein surfaces of the valve body extending between the gas inlet and the heat exchanger, and between the heat exchanger and the gas outlet, are smoothly rounded.

8. The heat recovery device according to claim 7, wherein said valve element engages said smoothly rounded surfaces with the valve element in the bypass position.

9. The heat recovery device according to claim 7, wherein at least one of said smoothly rounded surfaces is provided with an indentation to receive an edge of the valve element when the valve element is in the bypass position.

10. The heat recovery device according to claim 1, wherein the valve body has a sealing surface along which it is secured to the heat exchanger, said sealing surface surrounding an opening in said valve body through which flow communication is provided between an interior of the valve body and the heat exchanger; and
with the valve element in the bypass position, the sealing surface of the valve body is spaced from the valve element such that a closed chamber is formed inside the valve body between the bypass gas flow path and the sealing surface.

11. A heat recovery device comprising a gas diverter valve and a gas/liquid heat exchanger;
the gas diverter valve comprising a valve body; a valve element movable between a bypass position and a heat exchange position; and a gas inlet and a gas outlet formed in the valve body;
the gas/liquid heat exchanger comprising a heat exchanger core comprised of a stack of core plates, the core comprising a plurality of gas flow passages and a plurality of liquid flow passages arranged in alternating order, a gas inlet manifold and a gas outlet manifold in flow communication with said plurality of gas flow passages, and a liquid inlet manifold and a liquid outlet manifold in flow communication with said plurality of liquid flow passages;
a mounting plate secured to the bottom plate of the heat exchanger;
wherein a bypass gas flow path extends between the gas inlet and the gas outlet of the valve body and the heat exchanger is located outside the bypass gas flow path;
wherein, with the valve element in the bypass position, the bypass gas flow path is substantially completely open and flow communication between the gas inlet and the heat exchanger is substantially completely blocked by the valve element; and
with the valve element in the heat exchange position, the bypass gas flow path is substantially completely blocked by the valve element, and the gas inlet is in flow communication with the heat exchanger;
wherein the core includes a plurality of core plates, each of the core plates having two liquid manifold openings and two gas manifold openings, wherein each of the core plates has a gas side and a liquid side, and wherein the core plates are sealed together in the core such that each of the gas flow passages is defined between the gas sides of two adjacent core plates and each of the liquid flow passages is defined between the liquid sides of two adjacent core plates, and such that the manifold openings in the plates align to form said manifolds, with the gas inlet and outlet manifolds in flow communication with the gas flow passages and the liquid inlet and outlet manifolds in flow communication with the liquid flow passages;
wherein the valve body has a sealing surface along which it is secured to the mounting plate, said sealing surface surrounding an opening in said valve body through which flow communication is provided between an interior of the valve body and the heat exchanger; and
wherein the mounting plate is provided with a gas inlet manifold opening in alignment with said gas inlet manifold and a gas outlet manifold opening in alignment with said gas outlet manifold, and wherein the gas inlet and outlet manifold openings of the mounting plate are spaced apart from one another along the bypass gas flow path.

12. The heat recovery device according to claim 11, wherein a thermally insulating gasket is provided between the sealing surface of the valve body and the mounting plate.

13. The heat recovery device according to claim 11, wherein the valve body is secured to the mounting plate by mechanical fasteners.

14. The heat recovery device according to claim 11, wherein the sealing surface of the valve body, the mounting plate, and a sealing surface of the bottom plate are planar; and
wherein the sealing surface of the bottom plate surrounds the gas inlet and outlet manifolds of the bottom plate.

15. The heat recovery device according to claim 14, wherein the valve element pivots along a pivot axis extending through the valve body at an angle of about 90 degrees to the bypass gas flow path, and wherein an edge of the valve element engages a surface of the mounting plate with the valve element in the heat exchange position.

16. The heat recovery device according to claim 15, said surface of the mounting plate is provided with an upstanding flange which engages and overlaps an edge of the valve element when the valve element is in the heat exchange position.

17. A heat recovery device comprising a gas diverter valve and a gas/liquid heat exchanger;
the gas diverter valve comprising a valve body; a valve element movable between a bypass position and a heat exchange position; and a gas inlet and a gas outlet formed in the valve body;
the gas/liquid heat exchanger comprising a heat exchanger core comprised of a stack of core plates, the core comprising a plurality of gas flow passages and a plurality of liquid flow passages arranged in alternating order, a gas inlet manifold and a gas outlet manifold in flow communication with said plurality of gas flow passages, and a liquid inlet manifold and a liquid outlet manifold in flow communication with said plurality of liquid flow passages;
wherein a bypass gas flow path extends between the gas inlet and the gas outlet of the valve body and the heat exchanger is located outside the bypass gas flow path;
wherein, with the valve element in the bypass position, the bypass gas flow path is substantially completely open and flow communication between the gas inlet and the heat exchanger is substantially completely blocked by the valve element; and
with the valve element in the heat exchange position, the bypass gas flow path is substantially completely blocked by the valve element, and the gas inlet is in flow communication with the heat exchanger;
wherein the core includes a plurality of core plates, each of the core plates having two liquid manifold openings and two gas manifold openings, wherein each of the core plates has a gas side and a liquid side, and wherein the core plates are sealed together in the core such that each of the gas flow passages is defined between the gas sides of two adjacent core plates and each of the liquid flow passages is defined between the liquid sides of two adjacent core plates, and such that the manifold openings in the plates align to form said manifolds, with the gas inlet and outlet manifolds in flow communication with the gas flow passages and the liquid inlet and outlet manifolds in flow communication with the liquid flow passages;

wherein all of the core plates except the core plates at the top and bottom of the stack are identical; and wherein the heat transfer requirements of the device are adjustable simply by adding or removing one or more of said identical core plates to or from the core of the heat exchanger.

18. A gas/liquid heat exchanger for a heat recovery device, comprising a heat exchanger core comprised of a stack of core plates, the core comprising a plurality of gas flow passages and a plurality of liquid flow passages arranged in alternating order, a gas inlet manifold and a gas outlet manifold in flow communication with said plurality of gas flow passages, and a liquid inlet manifold and a liquid outlet manifold in flow communication with said plurality of liquid flow passages;

wherein the core includes a plurality of core plates, each of the core plates having two liquid manifold openings and two gas manifold openings, wherein each of the core plates has a gas side and a liquid side, and wherein the core plates are sealed together in the core such that each of the gas flow passages is defined between the gas sides of two adjacent core plates and each of the liquid flow passages is defined between the liquid siillustdes of two adjacent core plates, and such that the manifold openings in the plates align to form said manifolds, with the gas inlet and outlet manifolds in flow communication with the gas flow passages and the liquid inlet and outlet manifolds in flow communication with the liquid flow passages;

wherein the core includes a bottom core plate located at the bottom of the core, the bottom core plate including one of said gas inlet manifold openings and one of said gas outlet manifold openings and forming a closed bottom of the liquid inlet manifold and a closed bottom of the liquid outlet manifold; and wherein a bottom-most gas flow passage is defined between the bottom plate and an adjacent one of said core plates, said bottom-most gas flow passage being in direct heat exchange contact with only one of said liquid flow passages.

19. The gas/liquid heat exchanger according to claim 18, wherein the liquid inlet manifold opening and the liquid outlet manifold opening are provided along one side of the core plate, wherein the liquid flow passages are U-shaped, and wherein a rib separates the liquid inlet and outlet manifold openings to prevent short-circuiting flow between the manifold openings; and wherein the rib is discontinuous, and provides gaps through which a portion of the liquid is able to flow through the rib.

* * * * *